US008132261B1

United States Patent
Simpson et al.

(10) Patent No.: US 8,132,261 B1
(45) Date of Patent: Mar. 6, 2012

(54) DISTRIBUTED DYNAMIC SECURITY CAPABILITIES WITH ACCESS CONTROLS

(75) Inventors: Michel S. Simpson, American Fork, UT (US); William D. Peterson, III, Provo, UT (US); Stephen R Carter, Spanish Fork, UT (US); Nathan B. Jensen, Spanish Fork, UT (US); William Street, Orem, UT (US)

(73) Assignee: Oracle International Corporation, Redwood City, CA (US)

( * ) Notice: Subject to any disclaimer, the term of this patent is extended or adjusted under 35 U.S.C. 154(b) by 2014 days.

(21) Appl. No.: 10/734,935

(22) Filed: Dec. 12, 2003

(51) Int. Cl.
*G06F 7/04* (2006.01)

(52) U.S. Cl. ............................................. 726/27; 726/2

(58) Field of Classification Search .................. 713/165, 713/167, 168, 176; 726/2, 27
See application file for complete search history.

(56) References Cited

U.S. PATENT DOCUMENTS

| 5,787,175 | A | * | 7/1998 | Carter | 713/165 |
| 6,119,230 | A | | 9/2000 | Carter | |
| 6,154,840 | A | * | 11/2000 | Pebley et al. | 713/160 |
| 7,017,183 | B1 | * | 3/2006 | Frey et al. | 726/5 |
| 7,191,195 | B2 | * | 3/2007 | Koyama et al. | 1/1 |
| 7,272,550 | B2 | * | 9/2007 | Chen et al. | 703/27 |
| 2005/0021938 | A1 | * | 1/2005 | Kidokoro | 713/152 |
| 2006/0173999 | A1 | * | 8/2006 | Rider et al. | 709/225 |

FOREIGN PATENT DOCUMENTS

GB 2389929 A * 12/2003

* cited by examiner

*Primary Examiner* — Samson Lemma

(74) *Attorney, Agent, or Firm* — Marger Johnson & McCollom

(57) ABSTRACT

A method and system are disclosed for distributed dynamic security of a document. Portions of a document are associated with a plurality of member definitions. Each member definition contains an access right associated with a user. An access controller receives a request from a user and determines whether that user has sufficient access rights to access a portion of the document.

18 Claims, 4 Drawing Sheets

DISTRIBUTED DYNAMIC SECURITY CAPABILITIES WITH ACCESS CONTROLS

FIELD OF THE INVENTION

The present invention relates to a computer-implemented method and apparatus for controlling a work group document, and more particularly to methods which allow each member of a specified group to encrypt and/or decrypt a document or to digitally sign and/or authenticate the document by using a key that is unique to the member in question, and to methods which prevent access to the document by persons who are not currently members of the group.

BACKGROUND

In today's computer network environment, it is common that significant amounts of data are customarily stored and used by various users across a multitude of applications, systems, and databases. Naturally, data management has become an essential task for many data intensive industries. A smooth business operation relies both on the efficiency and security of the applications, systems, and databases. With the advancement of computer technologies, the size and complexity of applications, systems, and databases are increasing continuously.

Different users of the applications, systems, and databases normally have different levels of access rights. From the perspective of data management, an administrator is powerful in that he usually has a full access to the applications, systems, and databases and all data stored therein. He can freely read, write and modify any stored data. However, other users may be given different access rights depending on their needs. Some may have read access rights only, while others have write access rights.

SUMMARY

A method and system for distributed dynamic security is provided. In one embodiment, the access right for a user is determined. A member definition is built using the access right and associating the member definition with the user. The member definition is linked to a portion of a document.

In another embodiment comprises a document with a first data and a second data. A first member definition is associated with the first data, and the first member definition contains a first user identifier and a first access right for a first user for the first data. A second member definition is associated with the second data, and the second member definition contains a second user identifier and a second access right for a second user for the second data. The embodiment also includes an access controller that receives a request from the first user for access to the document, and the access controller locates the first member definition and allows access to the document.

Another embodiment comprises a computer-readable medium comprising a plurality of instructions for execution by at least one computer processor. The instructions are for determining a first access right for a first user and a second access right for a second user. A first member definition is built using the first access right, a first user identifier, and a first digital signature and a second member definition is built using the second access right, a second user identifier, and a second digital signature. The first member definition is linked to a first portion of a document and the second member definition is linked to a second portion of the document. The first member definition and second member definition are stored remotely from the document, and the document is encrypted. A request is received from a requester to access the document. Based on the first user identifier and the second user identifier, the access right for the user for first portion of the document and the second portion of the document is determined, access is allowed only to the document in accordance with the first access right and second access right.

DETAILED DESCRIPTION

Figure 1:
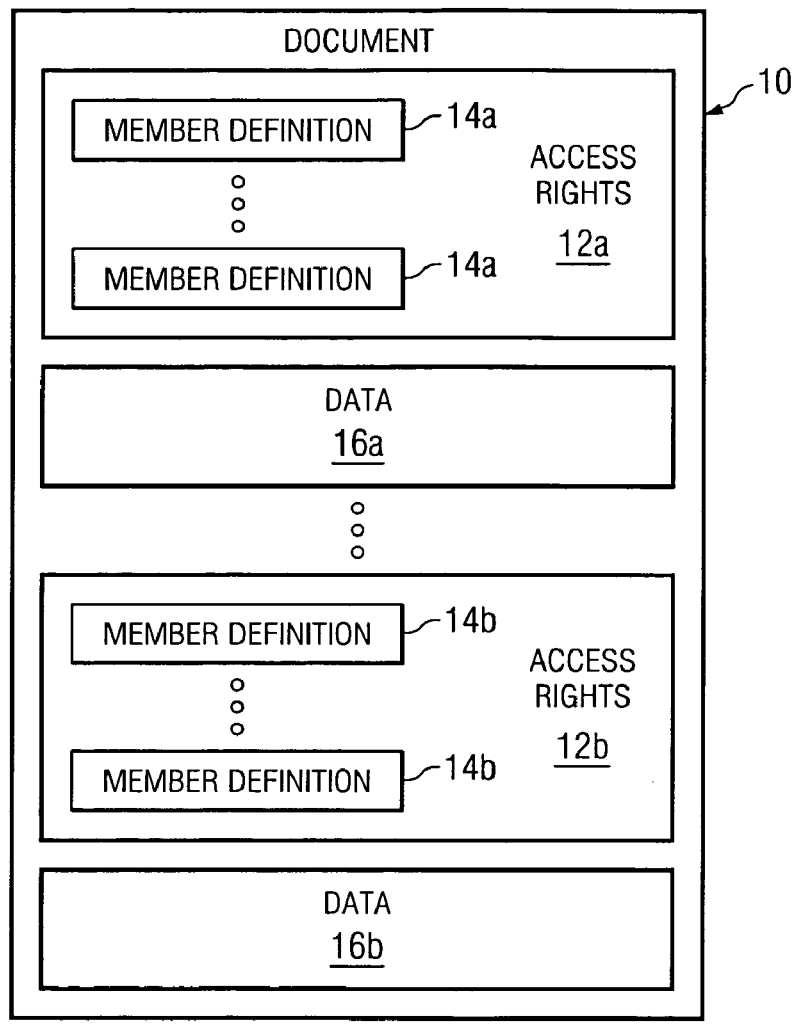
FIG. 1 is a diagram illustrating a document in one embodiment for use with the present invention.

Referring to FIG. 1, one embodiment of a document 10 for distributed dynamic security capabilities with access controls is shown. Documents may be any combination of text, numbers, computer program source code, computer hardware schematics or layouts, database records, digitized audio, digitized video, digitized visual images, or other digital information. Documents may be stored on magnetic or optical disks, but they may be stored in any medium capable of retaining digital information.

The document 10 includes access rights 12 and data 16. The access rights 12 and the data 16 are each capable of being stored in at least one file in a computer system 10. In some documents, the access rights 12 may be different for a different portion of the document's data 16. For illustrative purposes, document 10 is shown with two sections of data 16a, 16b and two sets of access rights 12a, 12b.

The relative location of the access rights 12 with respect to data 16 may be any combination. That is, the information kept in the access rights 12 may be placed at the front of the document 10 or may be placed following the data 16. In addition, the access rights 12 may be located in a separate document, at a separate location within the same document as the data portion, or even interleaved with parts of the data 16.

The access rights 12 include at least one member definition 14. As described in more detail below, a member definition 14 sets out the applicable access rights to a some or all of the document 10. In some instances, there will be a member definition for the owner of the document. The owner's access to the document may be absolute, or there could be predefined owner access rights set by the system.

The member definition 14 may be located in the same file as the data 16 or in one or more separate files. The files can be any form of tagged file format, including an XML document via the XML Security standards, as well as text files, binary files, or other file types. In addition, the member definitions 14 may be in text documents or binary documents appended to the document 10, or the member definitions 14 may be in text documents or binary documents stored separately from the document 10.

In addition, the document 10 may be encrypted and digitally signed. The encryption could be performed by associating a member definition with a pair of encryption keys (e.g. public and private keys), as is understood in the art, and one of the keys could be placed in the member definition 14. In one embodiment, each data 16 could be encrypted separately. Further, data 16 may also contain additional access rights portion and data, such that multiple levels of access rights exist to protect a given portion of data.

Figure 2:
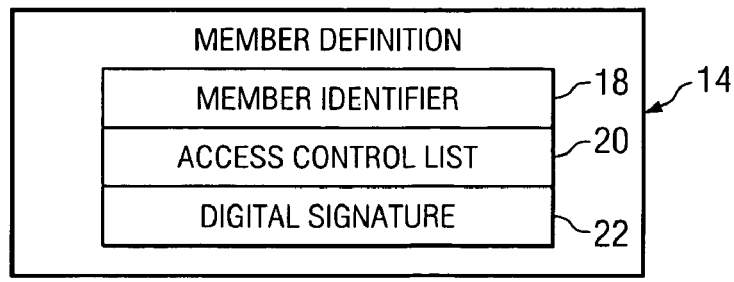
FIG. 2 is a diagram illustrating a member definition in one embodiment for use with the present invention.

Referring now to FIG. 2, an example member definition 14 is shown. The member definition may comprise a member identifier 18, an access control list 20, and a digital signature 22. Member identifier 18 can be an identifier used by an operating system for a user, as well as identifiers defined for use in connection with document access.

Access control list 20 are the applicable access rights for this particular member. An "access control list" can be used as a basis for permitting access to a document. Different computer systems configure access control lists differently, but in general system users are assigned to one or more groups by a system administrator and a list which matches groups with access rights is associated with documents in the computer system. Access rights can be any form of access right for a particular computer system, including read, write, read/write, execute, and delete. Other access rights are also readily known in the art and could be used.

The ACL portion of the member definitions is evaluated by an access mechanism. An access mechanism can be an agent, service, file system extension (e.g., a POSIX extension), or a file system access.

When an access mechanism processes an access request, only that portion of the document that is accessible via the ACL of the member definition will be affected.

Digital signature 22 is a digital signature that can be used for authentication of the member 14. In one embodiment, the digital signature 22 is used to authenticate the user accessing the member definition 14. In another embodiment, the digital signature 22 can be used to authenticate the access control list of the member definition. In addition, the member definition may contain a private key for use in encrypting one or more data portions 16 (FIG. 1) of the document 10 (FIG. 1).

Figure 3:
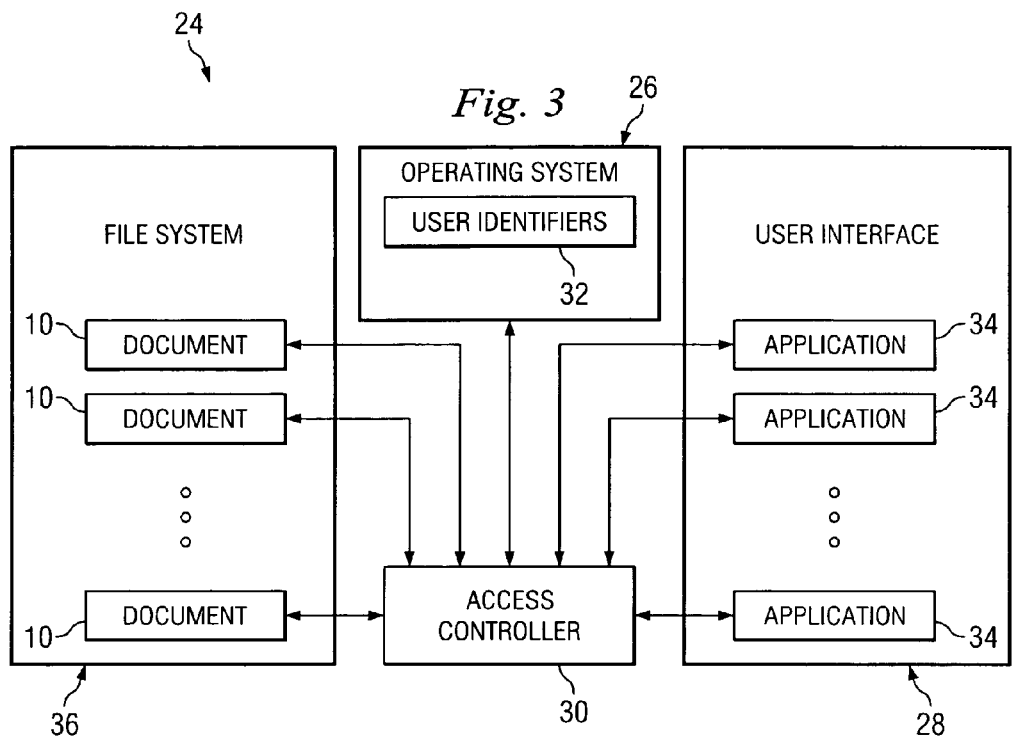
FIG. 3 is a diagram illustrating a computing system suitable for use with one embodiment of the present invention.

One embodiment 24 of a computer system according to the present invention is further illustrated in FIG. 3. Users of the computer system access and manipulate information with the aid of a user interface 28. Suitable user interfaces 28 can include command line interpreters, shells, or graphical user interfaces.

The user interface 28 is capable of launching one or more application programs 34 that are tailored to solve particular problems or manipulate particular types of data. An enormous variety of application programs 34 are known in the art, such as word processors, spreadsheets, database managers, presentation managers, and program development tools. The application programs 34 may be configured to run on a single processor, on a multiprocessor, or on a distributed system such as the computer network.

The application programs 34 interface with an access controller 30. Access controller 30 determines whether the particular application 34 or user of the application 34 has sufficient access rights. For example, if a user belongs to a group specified in the access control list of a given document as having read and write access to the document, then the user will be given read and write access to the document by the computer system. If the user belongs to a group specified in the access control list of the document as having read access only, then the system will give the user read access but will deny write access to the document in question. In addition to the ability to limit reads and writes, access control lists may also control other rights, including the right to execute a file and the right to modify the access control list for a file.

The access controller 30 may be contained in .DLL files, in .EXE files, in OLE objects, and in other software components, and may be stored separately from the applications 34. Alternatively, some or all of access controller 30 may be linked into selected applications 34 at compile-time or at run-time. Access controller 30 may be implemented in software, in hardware, or in a combination of software and hardware. The access controller 30 may also be agent, service, file system extension or a file system, such as a directory.

The access controller 30 interfaces with an operating system 26. The operating system manages various resources of the computer system. In one embodiment, the functions provided by the operating system 26 are provided by the access controller 30, and in another embodiment, by individual applications 34.

In some embodiments, the operating system 26 generates, maintains, and manages a set of user identifiers 32 such as login names or account numbers. User identifiers 32 may be used to track usage of resources, to assist in verifying resource access rights, and to identify system users to one another. A login password may be associated with each user identifier 32.

Access controller 30 also interfaces with a file system 36. The file system 36 manages files and other documents, including one or more documents 10, that may be generated and manipulated using the computer system. Although documents 10 are typically generated and manipulated by users directly with one or more of the application programs 34, on some systems documents may also be generated and manipulated at times without direct user intervention.

A document 10 does not necessarily correspond to a file. Each document 10 maintained in the file system 36 may in practice be stored in a portion of a file that holds other documents 10, in a single file dedicated to the document 10 in question, or in a set of coordinated files.

Figure 4:
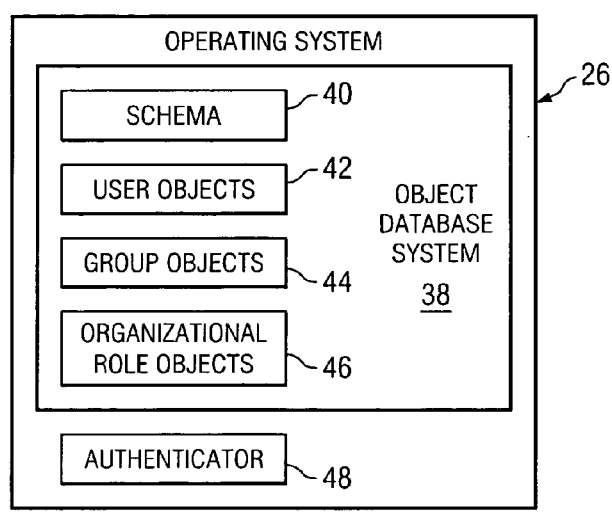
FIG. 4 is a diagram illustrating an operating system suitable for use with one embodiment of the present invention.

FIG. 4 illustrates an embodiment of the present invention that utilizes a network operating system as the operating system 26. In some instances the network operating system 26 comprises an object database system 38 and an authenticator 48 that restricts access to the object database system 38.

The object database system 38 includes a schema 40 that defines a variety of objects. Some example objects are user objects 42, group objects 44, and organizational role objects 46. The schema 40 includes a set of "attribute syntax" definitions, a set of "attribute" definitions, and a set of "object class" (also known as "class") definitions.

Each attribute syntax in the schema 40 is specified by an attribute syntax name and the kind and/or range of values that can be assigned to attributes of the given attribute syntax type. Attribute syntaxes thus correspond roughly to data types such as integer, float, string, or Boolean in conventional programming languages.

One of the many computer networks suited for use with the present invention is indicated generally at 10 in FIG. 1. The network 10 may include a variety of nodes.

Figure 5:
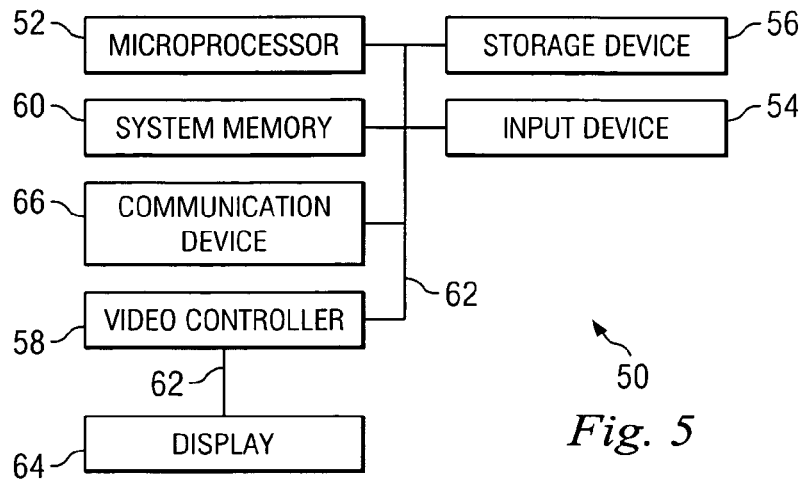
FIG. 5 is a diagram illustrating a node suitable for use with one embodiment of the present invention.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring to FIG. 5, an illustrative node 50 for implementing an embodiment of the method is depicted. Node 50 includes a microprocessor 52, an input device 54, a storage device 56, a video controller 58, a system memory 60, and a display 64, and a communication device 66 all interconnected by one or more buses 62. The storage device 56 could be a floppy drive, hard drive, CD-ROM, optical drive, or any other form of storage device. In addition, the storage device 56 may be capable of receiving a floppy disk, CD-ROM, DVD-ROM, or any other form of computer-readable medium that may contain computer-executable instructions. The computer-readable medium embodies a program, functions, and/or instructions that are executable by a node or nodes. Further, communication device 66 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

Figure 6:
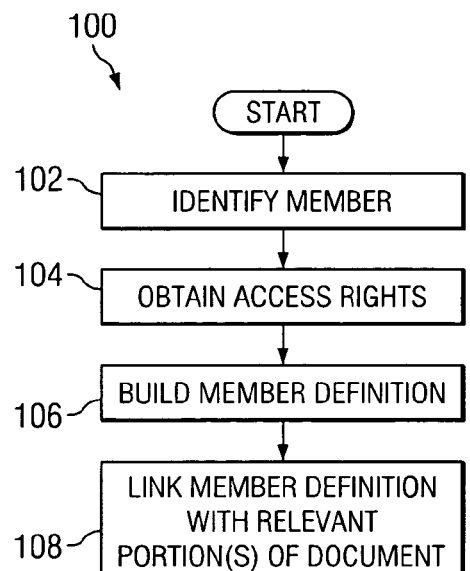
FIG. 6 is flowchart illustrating a method for establishing a set of access rights to a document in one embodiment of the present invention.

Referring now to FIG. 6, an example 100 of the operation establishing a set of access rights to a document in an embodiment of distributed dynamic security is shown. At step 102, the member is identified. Identification may be accomplished by obtaining user identifiers through dialog boxes or other interactive user interfaces, by identifying a group object or other group identifier that is known to the operating system, or by other identification means familiar to those of skill in the art.

At step 104, the access rights for the identified member are obtained. In one embodiment the access rights for a particular member are established from a default in the operating system. In another embodiment, the access rights for a particular member may have been established by an administrator or supervisor.

At step 106, a member definition for the member is constructed. This step may be performed by an access controller. At step 108, the member definition is associated with the particular data element in a document. In another embodiment, the association comprises storing the member definition in one file and storing the data in a separate file. In turn, these two files are associated with one another by creating a file naming convention, by listing the files in a data structure kept in one of the files, by listing the files in a data structure kept in the object database system, or by other means readily determined by those of skill in the art for associating files.

In one embodiment, a digital signature of the user causing the creation of the member definition is included in the member definition. This digital signature could be used to authenticate the member definition.

Figure 7:
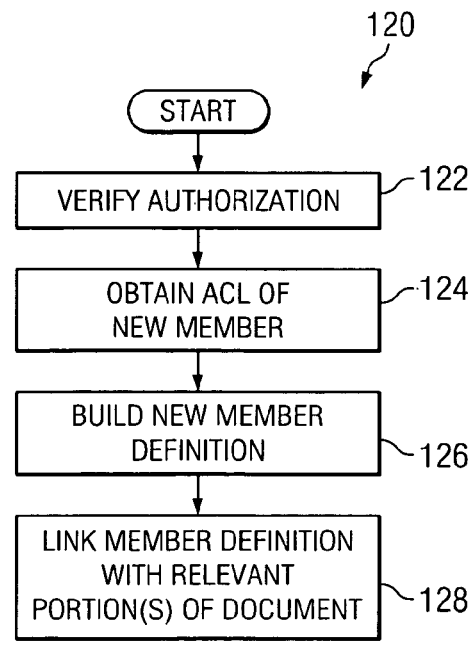
FIG. 7 is a flowchart illustrating a method for adding a new member to a document in one embodiment of the present invention.

FIG. 7 illustrates a method 120 according to one embodiment of present invention for adding a new member to a document. At step 122, an access controller verifies that the user requesting the addition of the new member is authorized to add new members to a document. In one embodiment, authorization to add members is granted only to the user who created the document. In another alternative embodiment, only the user who created the document is initially authorized to change group membership, but that user may delegate that authority to one or more other group members.

Verification may include searching the member definitions in the access rights portion of the document in an attempt to locate a member identifier that corresponds to the user who is requesting the change. If a corresponding member identifier is found, the user is authorized to make the request. Otherwise, the user is not authorized to request changes in the membership of that group.

At step 124, the access controller obtains the access control list that corresponds to the user being added to the document. At step 126, a new member definition is built. At step 128, the new member definition is associated with the particular data element in a document. In another embodiment, the association comprises storing the member definition in one file and storing the data in a separate file. In turn, these two files are associated with one another by creating a file naming convention, by listing the files in a data structure kept in one of the files, by listing the files in a data structure kept in the object database system, or by other means readily determined by those of skill in the art for associating files.

Figure 8:
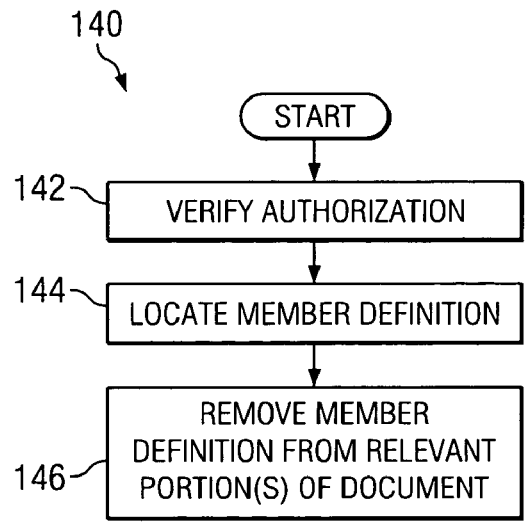
FIG. 8 is a flowchart illustrating a method for removing a member from a document in one embodiment of the present invention.

Referring now to FIG. 8, an example 140 of a method for removing a member from a document. At step 142, the access controller verifies that the user requesting the removal of the targeted member is authorized to remove members. As discussed above, any current member of a document may have authority to add or remove members, but alternative approaches to authorization are also available.

Verifying may include searching the member definitions in the access rights portion of the document for a member identifier that corresponds to the user who is requesting the change in group membership. If a corresponding member identifier is found, the user is authorized to make the request. Otherwise, the user is not authorized to request changes in the membership of that group.

At step 144, the access controller searches the member definitions in the access rights portion of the document for a member identifier that corresponds to the targeted member. If a corresponding member identifier is found, the targeted member definition is deleted from the relevant portion of the document, step 146. If the search fails, the targeted "member" is not a member of the document, and thus no change is made to the document.

Figure 9:
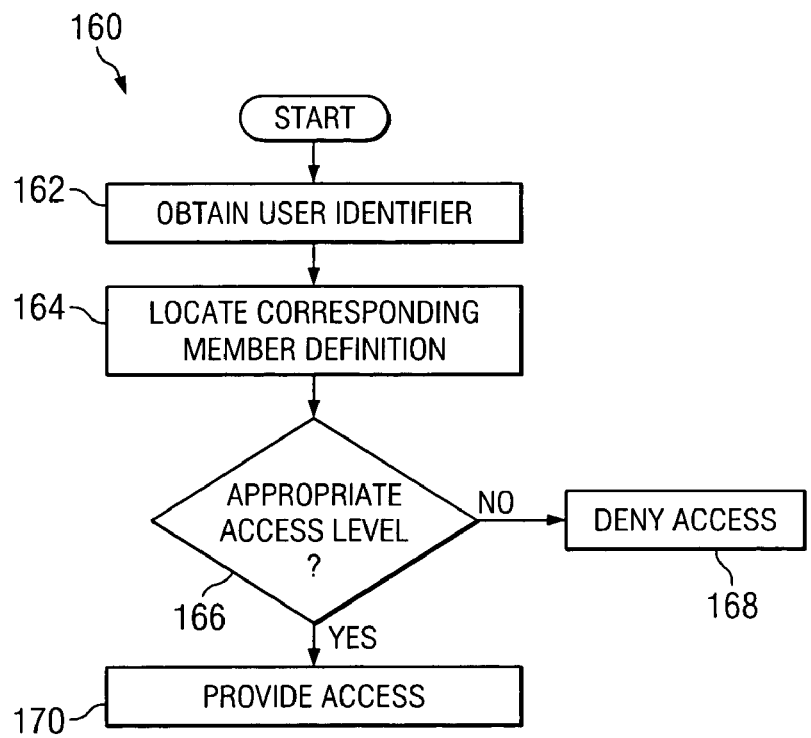
FIG. 9 is a flowchart illustrating a method for restricting access to the information in the data portion of the document in one embodiment of the present invention.

Referring now to FIG. 9, a method 160 for restricting access to the information in the data portion of the document is shown. At step 162, requesting object detects that the document to which access is requested is a document that has distributed dynamic security. The requesting object could be the operating system, the object database system, the file system, an application, or any other component of the computing system. In one embodiment, the detection is accomplished when the requesting object detects a particular flag setting in the document. In another embodiment, the requesting object detects a particular naming convention exhibited in the name of the file that contains the data portion. Other mechanisms for detecting that the document has distributed dynamic security can be readily determined by those of skill in the art.

In another embodiment, the requesting object may not be capable of distinguishing distributed dynamic security documents from other documents. In this case, one of two events may occur. Either the application fails to read the document and displays an error message, or the application displays the data to the user; however, the data could be in encrypted form.

At step 162, the user identifier is obtained. The obtaining may be embodied within an application or may be a separate module that is invoked by the application 34 or by the user. Other embodiments may require that a corresponding password also be obtained. In alternative embodiments, the user identifier identifies the current user and is obtained by querying the operating system or the object database system, while the password is obtained interactively from the user.

At step 164, the access controller attempts to use the information provided during the step 152 to obtain the member definition of the identified user in the document. In one embodiment, if the member definition contains a digital signature, that digital signature could be verified in order to determine if the member definition is properly a part of the requested document (e.g. the digital signature is that of the owner or administrator of the document), or if the digital signature matches the user identifier of the user accessing the document. If one or more member definitions are located, then at step 166, the access controller examines the access control list in those member definitions to determine whether the user has the appropriate access level for each relevant data portion of the document. If the user does not have sufficient access rights for the desired action, then access to that portion of the document is denied, step 168. If the user does have sufficient access rights, then the appropriate access is provided to that user, step 170.

Accordingly, the access controller is able to limit access to the information in the data portion of the document. In one embodiment, the limiting step merely denies the user access by preventing access to the data portion. In other embodiments, access is prevented and additional steps are taken as well. One embodiment logs information about the failed attempt, such as the time, workstation, collaborative document name, user identifier, etc. Another embodiment uses e-mail, telephony, alarms, or other conventional means to notify security personnel of the failed attempt. A third embodiment both logs the information and notifies security.

Those of skill will appreciate that preferred embodiments of the present invention report errors and other conditions which interfere with the invention as it assists users in controlling work group files. Suitable error reporting and recovery means are readily determined by those of skill in the art. Suitable techniques for diagnosing and debugging implementations of the present invention are likewise readily determined by those of skill in the art.

What is claimed is:

1. A computer-implemented method employing a microprocessor for controlling access to a document, the method comprising:
   determining, using the microprocessor, an access right for a user, the access right indicating whether the user has permission to read, write, execute, and/or delete;
   building a member definition comprising a member identifier, an access control list comprising a list of access rights of the user, a private key of a key pair for use in encrypting the document, and a digital signature, and associating the member definition with the user;
   linking the member definition to a first data portion of a document, wherein the document has the first data portion and a second data portion;
   receiving a request from the user to access the document;
   comparing the request with the access right;
   allowing access to only the first data portion in accordance with the access right; and
   denying access to the second data portion in accordance with the access right, wherein the denying access comprises at least one of logging information regarding the denial of access to the second data portion, and notifying security personnel regarding the denial of access to the second data portion;
   the method further comprising:
   determining a second access right for the user;
   building a second member definition using the second access right;
   and linking the second member definition to the second data portion of the document.

2. The method of claim 1, further comprising adding a new user to the document.

3. The method of claim 1, further comprising removing a member from the document.

4. The method of claim 1, further comprising:
   storing the member definition remotely from the document.

5. The method of claim 1, further comprising:
   storing the member definition in the document.

6. The method of claim 1, further comprising:
   encrypting the document; and
   linking the member definition with a public key and a private key.

7. The method of claim 1, wherein the first data portion of the document and the second data portion of the document are different.

8. A computer-implemented system for controlling access to a document, comprising:
   a microprocessor;
   memory accessible by the microprocessor;
   a document comprising a first data and a second data;
   a first member definition associated with the first data, wherein the first member definition contains a first user identifier, a private key of a first key pair for use in encrypting the first data, and a first access control list including a first access right for a first user for the first data, the first access right indicating whether the first user has permission to read, write, execute, and/or delete;
   a second member definition associated with the second data, wherein the second member definition contains a second user identifier, a private key of a second key pair for use in encrypting the second data, and a second access control list including a second access right for a second user for the second data, the second access right indicating whether the second user has permission to read, write, execute, and/or delete; and
   an access controller that receives a request from the first user for access to the document, wherein the access controller locates the first member definition and allows access to the first data only and denies access to the second data, wherein the denying access comprises at least one of logging information regarding the denial of access to the second data, and notifying security personnel regarding the denial of access to the second data.

9. The system of claim 8, wherein the access controller limits access to the document in accordance with the first access right and the second access right.

10. The system of claim 8, wherein the first user identifier and the second user identifier identify the same user and the first access right and the second access right identify different access rights.

11. The system of claim 8, wherein the first member definition contains a digital signature.

12. The system of claim 8, wherein the first member definition and second member definition are stored remotely from the document.

13. The system of claim 8, wherein the first member definition and second member definition are stored in the document.

14. The system of claim 8, wherein the document is a tagged document.

15. The system of claim 8, wherein the document is an XML document.

16. The system of claim 8, wherein the document is a text document.

17. The system of claim 8, wherein the document is a binary document.

18. A non-transitory computer-readable storage medium comprising a plurality of instructions for execution by at least one computer processor, wherein the instructions are for:

- determining a first access right for a first user and a second access right for a second user, the first access right and the second access right indicating whether the first user and the second user have permission to read, write, execute, and/or delete;
- building a first member definition comprising a first user identifier, a private key of a first key pair for enabling the first user to encrypt a first data portion of a document, a first digital signature, and a first access control list including the first access right for the first user;
- building a second member definition comprising a second user identifier, a private key of a second key pair for enabling the second user to encrypt a second data portion of the document, a second digital signature, and a second access control list including the second access right for the second user;
- linking the first member definition to the first data portion of the document;
- linking the second member definition to the second data portion of the document;
- storing the first member definition and second member definition remotely from the document;
- encrypting the document;
- receiving a request from a requester to access the document;
- based on the first user identifier and the second user identifier, determining the access right for the requester for the first data portion of the document and the second data portion of the document; and
- allowing access only to the first data portion of the document and denying access to the second data portion in accordance with the first access right, or allowing access only to the second data portion of the document and denying access to the first data portion in accordance with the second access right, wherein the denying access comprises at least one of logging information regarding the denial of access, and notifying security personnel regarding the denial of access.

* * * * *